United States Patent
Okada et al.

(10) Patent No.: US 11,573,301 B2
(45) Date of Patent: Feb. 7, 2023

(54) ELECTROMAGNETIC WAVE DETECTION APPARATUS, PROGRAM, AND ELECTROMAGNETIC WAVE DETECTION SYSTEM

(71) Applicant: KYOCERA Corporation, Kyoto (JP)

(72) Inventors: Hiroki Okada, Machida (JP); Eri Uchida, Yokohama (JP); Hiroyuki Minagawa, Yokohama (JP); Yoshiteru Takayama, Susono (JP); Mitsuo Ono, Mitaka (JP); Atsushi Hasebe, Yokohama (JP); Katsutoshi Kawai, Ichinomiya (JP); Yukitoshi Kanayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 711 days.

(21) Appl. No.: 16/486,962

(22) PCT Filed: Feb. 8, 2018

(86) PCT No.: PCT/JP2018/004455
§ 371 (c)(1),
(2) Date: Aug. 19, 2019

(87) PCT Pub. No.: WO2018/155212
PCT Pub. Date: Aug. 30, 2018

(65) Prior Publication Data
US 2020/0233067 A1 Jul. 23, 2020

(30) Foreign Application Priority Data
Feb. 23, 2017 (JP) .................. JP2017-032029

(51) Int. Cl.
*G01S 7/4863* (2020.01)
*G01S 17/894* (2020.01)
(Continued)

(52) U.S. Cl.
CPC ............ *G01S 7/4863* (2013.01); *G01S 17/06* (2013.01); *G01S 17/89* (2013.01); *G01S 17/894* (2020.01)

(58) Field of Classification Search
CPC ...... G01S 7/4863; G01S 7/4817; G01S 17/06; G01S 17/894
See application file for complete search history.

(56) References Cited

U.S. PATENT DOCUMENTS 9,689,667 B2   6/2017  Royo Royo et al.
2007/0216769 A1   9/2007  Zganec et al.
(Continued)

FOREIGN PATENT DOCUMENTS

DE  10 2005 049 471 A1  5/2007
JP  2004-163271 A  6/2004
(Continued)

*Primary Examiner* — Thanh Luu
(74) *Attorney, Agent, or Firm* — Studebaker & Brackett PC

(57) ABSTRACT

An electromagnetic wave detection apparatus (10) includes an irradiator (11), a first detector (17), a memory (19), and a controller (20). The irradiator (11) irradiates electromagnetic waves. The first detector (17) includes detection elements. The detection elements detect, by irradiation position, reflected waves of the electromagnetic waves irradiated on an object (ob). The memory (19) stores first related information including an emission direction of the emitted electromagnetic waves. The controller (20) updates the first related information based on the position of the detection element, among the detection elements, that detects the reflected waves of the electromagnetic waves.

14 Claims, 11 Drawing Sheets

(51) Int. Cl.
*G01S 17/89* (2020.01)
*G01S 17/06* (2006.01)

(56) References Cited

U.S. PATENT DOCUMENTS

2014/0049783 A1   2/2014  Royo Royo et al.
2015/0378023 A1  12/2015  Royo Royo et al.

FOREIGN PATENT DOCUMENTS

| JP | 3740836 B2 * | 2/2006 |
| JP | 2011-220732 A | 11/2011 |
| JP | 2012-58158 A | 3/2012 |
| JP | 2014-512525 A | 5/2014 |

* cited by examiner

FIG. 3

First related information

| Signal value of drive signal | Orientation of reflecting surface |
|---|---|
| 000········000 | $(\theta_0, \phi_0)$ |
| 000········001 | $(\theta_0, \phi_1)$ |
| 000········010 | $(\theta_1, \phi_1)$ |
| 000········011 | $(\theta_1, \phi_2)$ |
| ⋮ | ⋮ |

FIG. 4

Second related information

| Position of detection element | Orientation of reflecting surface |
|---|---|
| $(x_0, y_0)$ | $(\theta_0, \phi_0)$ |
| $(x_0, y_1)$ | $(\theta_0, \phi_1)$ |
| $(x_1, y_1)$ | $(\theta_1, \phi_1)$ |
| $(x_1, y_2)$ | $(\theta_1, \phi_2)$ |
| ⋮ | ⋮ |

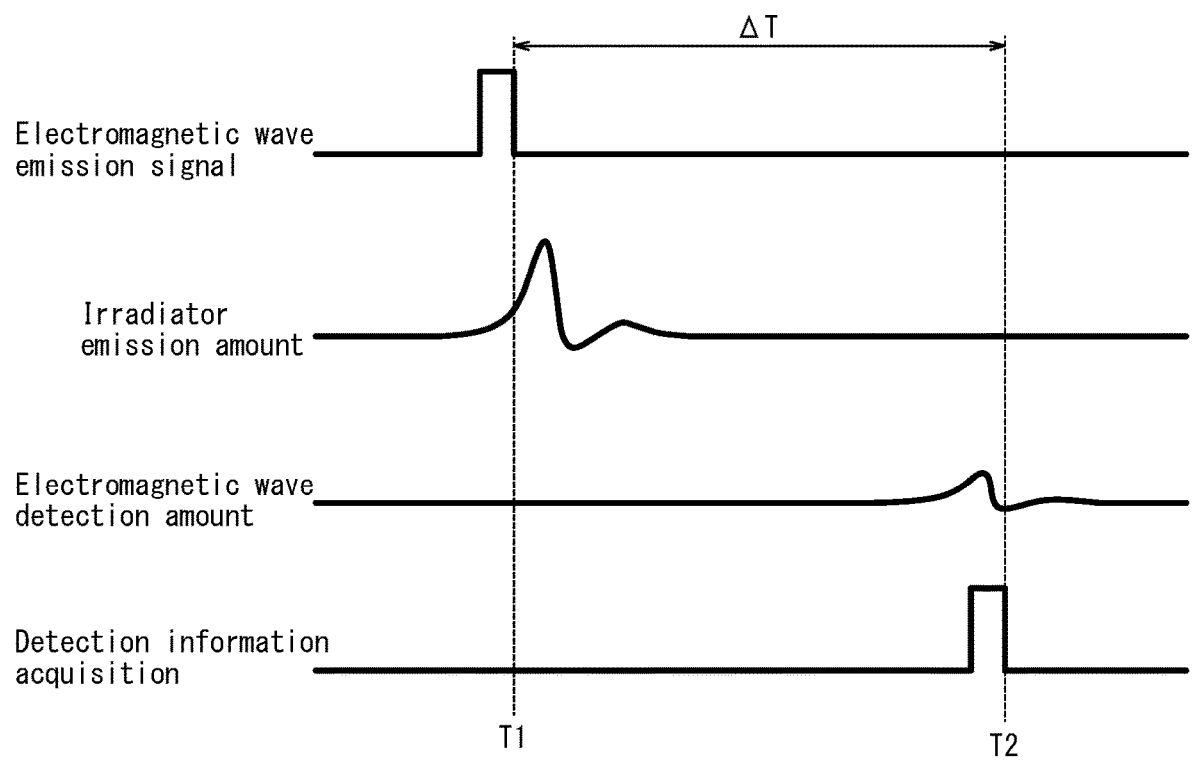

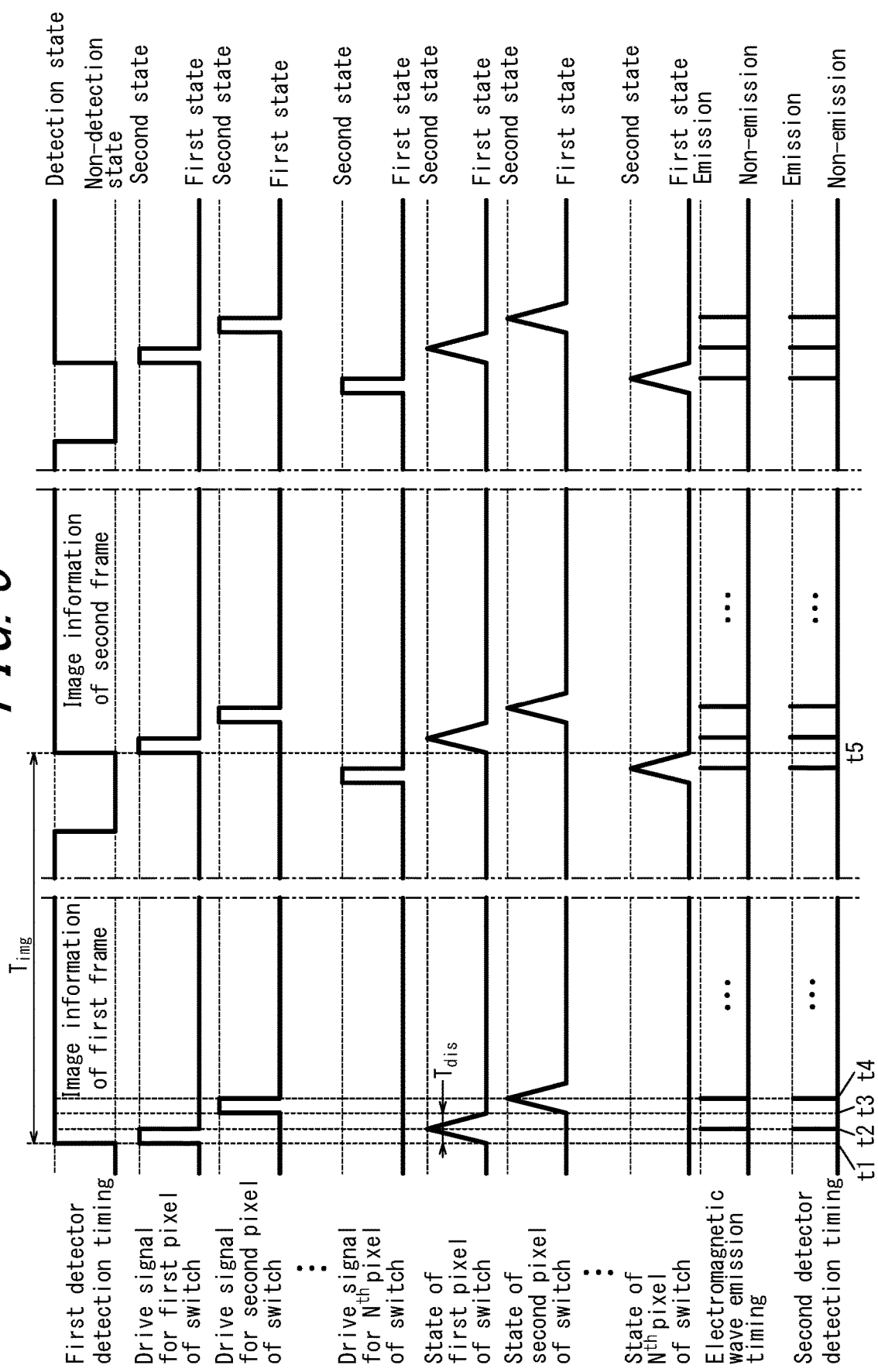

FIG. 10

Third related information

| Position of detection element | Position of pixel px |
|---|---|
| $(x_0, y_0)$ | $(x'_0, y'_0)$ |
| $(x_0, y_1)$ | $(x'_0, y'_1)$ |
| $(x_1, y_1)$ | $(x'_1, y'_1)$ |
| $(x_1, y_2)$ | $(x'_1, y'_2)$ |
| ⋮ | ⋮ |

FIG. 11

Fourth related information

| Orientation of reflecting surface | Position of pixel px |
|---|---|
| $(\theta_0, \phi_0)$ | $(x'_0, y'_0)$ |
| $(\theta_0, \phi_1)$ | $(x'_0, y'_1)$ |
| $(\theta_1, \phi_1)$ | $(x'_1, y'_1)$ |
| $(\theta_1, \phi_2)$ | $(x'_1, y'_2)$ |
| ⋮ | ⋮ | ns
ELECTROMAGNETIC WAVE DETECTION APPARATUS, PROGRAM, AND ELECTROMAGNETIC WAVE DETECTION SYSTEM

CROSS-REFERENCE TO RELATED APPLICATION

The present application claims priority to and the benefit of Japanese Patent Application No. 2017-032029 filed Feb. 23, 2017, the entire contents of which are incorporated herein by reference.

TECHNICAL FIELD

The present disclosure relates to an electromagnetic wave detection apparatus, a program, and an electromagnetic wave detection system.

BACKGROUND

In recent years, apparatuses have been developed to acquire information related to the surroundings from the results of detecting reflected waves of emitted electromagnetic waves. For example, an apparatus that uses laser radar to measure the position of an object is known, as in patent literature (PTL) 1.

CITATION LIST

Patent Literature
   PTL 1: JP2011-220732A

SUMMARY

An electromagnetic wave detection apparatus according to a first aspect includes:
   an irradiator configured to emit electromagnetic waves;
   a first detector comprising a plurality of detection elements configured to detect, by irradiation position, reflected waves of the electromagnetic waves irradiated on an object;
   a memory configured to store first related information including an emission direction of the emitted electromagnetic waves; and
   a controller configured to update the first related information based on a position of a detection element, among the plurality of detection elements, that detects the reflected waves of the electromagnetic waves.

An electromagnetic wave detection system according to a second aspect includes:
   an irradiator configured to emit electromagnetic waves;
   a first detector comprising a plurality of detection elements configured to detect, by irradiation position, reflected waves of the electromagnetic waves irradiated on an object;
   a memory configured to store first related information including an emission direction of the emitted electromagnetic waves; and
   a controller configured to update the first related information based on a position of a detection element, among the plurality of detection elements, that detects the reflected waves of the electromagnetic waves.

A program according to a third aspect is for causing an apparatus to execute steps comprising:
   emitting electromagnetic waves;
   using a plurality of detection elements to detect, by irradiation position, reflected waves of the electromagnetic waves irradiated on an object; and
   updating first related information based on a position of a detection element, among the plurality of detection elements, that detects the reflected waves of the electromagnetic waves, the first related information including an emission direction of the emitted electromagnetic waves.

BRIEF DESCRIPTION OF THE DRAWINGS

In the accompanying drawings:
FIG. 3 illustrates an example of first related information in the first embodiment;
FIG. 4 illustrates an example of second related information in the first embodiment;
FIG. 5 is a timing chart of the timing of irradiation and detection of electromagnetic waves to illustrate the principle of ranging by a ranging sensor configured by an irradiator, a second detector, and a controller of FIG. 1;
FIG. 6 is a timing chart to illustrate control of each portion for the controller to repeatedly acquire image information and distance information in the first embodiment;
FIG. 10 illustrates an example of third related information in a second embodiment;
FIG. 11 illustrates an example of fourth related information in the second embodiment.

DETAILED DESCRIPTION

Embodiments of an electromagnetic wave detection apparatus to which the present disclosure is applied are described below with reference to the drawings. When the emission direction of emitted electromagnetic waves is estimated from previously obtained information, the actual emission direction and the estimated emission direction may differ. Therefore, an electromagnetic wave detection apparatus to which the present disclosure is applied is configured to reduce the difference between the actual emission direction of electromagnetic waves and the estimated emission direction of electromagnetic waves.

Figure 1:
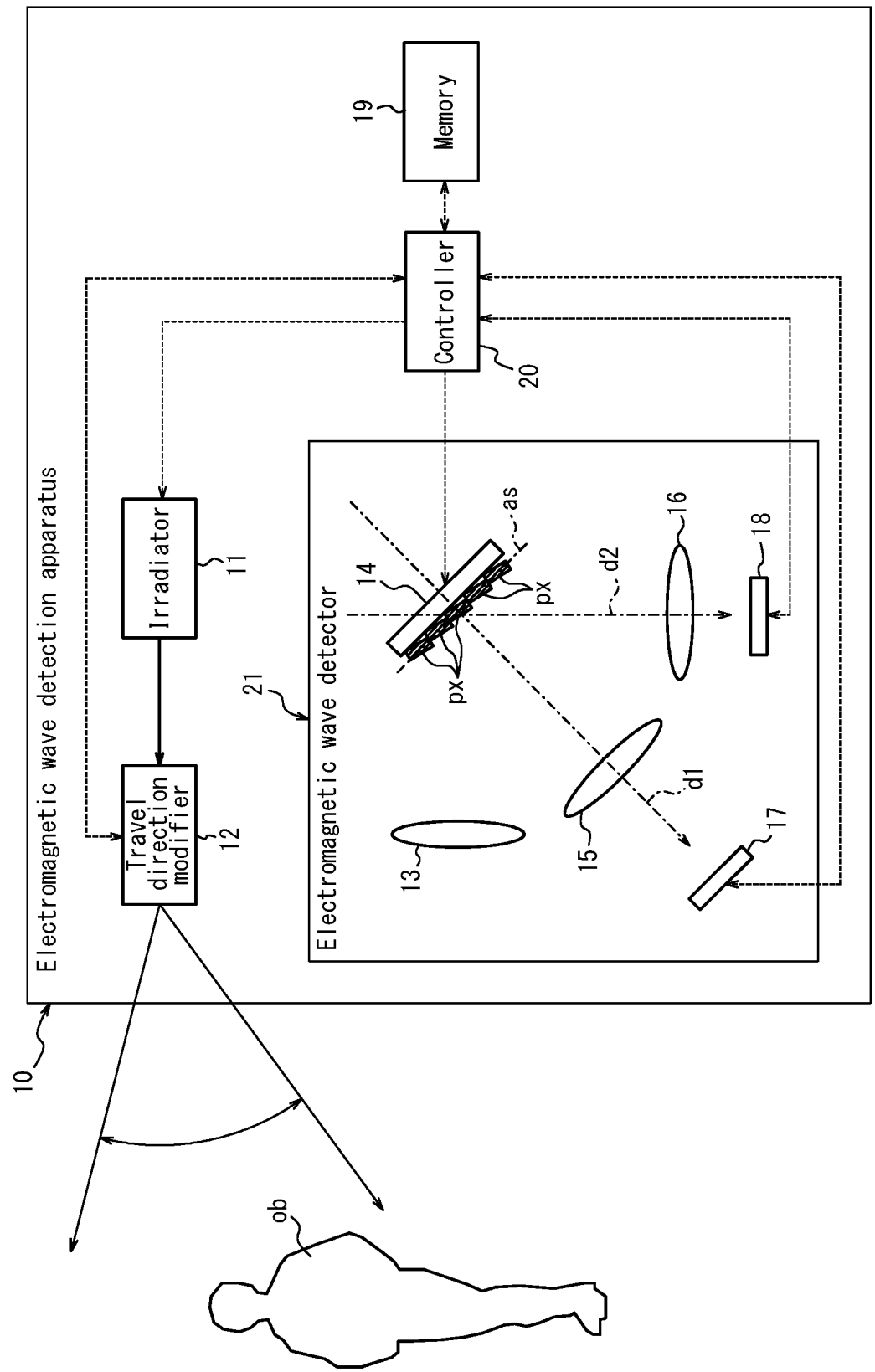
FIG. 1 is a configuration diagram schematically illustrating an electromagnetic wave detection apparatus according to a first embodiment.

As illustrated in FIG. 1, an electromagnetic wave detection apparatus 10 according to an embodiment of the present disclosure includes an irradiator 11, a travel direction modifier 12, a memory 19, a controller 20, and an electromagnetic wave detector 21. The electromagnetic wave detector 21 includes a pre-stage optical system 13, an advancing unit 14, a first post-stage optical system 15, a second post-stage optical system 16, a first detector 17, and a second detector 18.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

The irradiator 11 emits electromagnetic waves that, for example, are at least one of infrared rays, visible light rays, ultraviolet rays, and radio waves. In the first embodiment, the irradiator 11 emits infrared rays. The irradiator 11 irradiates the electromagnetic waves towards an object ob indirectly via the travel direction modifier 12.

In the first embodiment, the irradiator 11 emits a narrow beam, for example 0.5°, of electromagnetic waves. In the first embodiment, the irradiator 11 can emit pulses of electromagnetic waves. For example, the irradiator 11 includes a light emitting diode (LED), laser diode (LD), or the like. The irradiator 11 switches between emitting and not emitting electromagnetic waves based on control by the controller 20, described below.

The travel direction modifier 12 includes a reflecting surface capable of changing orientation. The travel direction modifier 12 changes the orientation of the reflecting surface based on a drive signal outputted by the controller 20, described below. In accordance with the drive signal, the reflecting surface changes the travel direction of the electromagnetic waves emitted from the irradiator 11, thereby irradiating the object ob while changing the irradiation position. In other words, the travel direction modifier 12 scans the object ob with the electromagnetic waves emitted from the irradiator 11. The travel direction modifier 12 scans the object ob in one or two dimensions. In the first embodiment, the travel direction modifier 12 scans the object ob in two dimensions.

The travel direction modifier 12 is configured so that at least a portion of an irradiation region of the electromagnetic waves that are emitted by the irradiator 11 and reflected is included in an electromagnetic wave detection range of the electromagnetic wave detection apparatus 10. Accordingly, at least a portion of the electromagnetic waves irradiated onto the object ob via the travel direction modifier 12 can be detected by the electromagnetic wave detection apparatus 10.

In the first embodiment, the travel direction modifier 12 is configured so that at least a portion of the irradiation region of the electromagnetic waves that are emitted by the irradiator 11 and reflected by the travel direction modifier 12 is included in the detection range of the first detector 17 and the second detector 18. Accordingly, in the first embodiment, at least a portion of the electromagnetic waves irradiated onto the object ob via the travel direction modifier 12 can be detected by the first detector 17 and the second detector 18.

The travel direction modifier 12 may, for example, include a micro electro mechanical systems (MEMS) mirror, a polygon mirror, a galvano mirror, or the like. In the first embodiment, the travel direction modifier 12 includes a MEMS mirror.

The pre-stage optical system 13 includes either or both of a lens and a mirror, for example, and forms an image of an object ob that is located in the irradiation region of electromagnetic waves and becomes a subject of imaging.

It suffices for the advancing unit 14 to be provided at or near a primary image formation position, which is the position where the image of the object ob located at a predetermined position separate from the pre-stage optical system 13 is formed by the pre-stage optical system 13. In the first embodiment, the advancing unit 14 is provided at the primary image formation position. The advancing unit 14 has an action surface "as" on which electromagnetic waves that pass through the pre-stage optical system 13 are incident. The action surface as is formed by a plurality of pixels (advancing elements) px aligned in a two-dimensional pattern. The action surface as is a surface that, in at least one of the first state and the second state described below, produces an effect on the electromagnetic waves such as reflection and transmission.

The advancing unit 14 can switch each pixel px between a first state of causing the electromagnetic waves incident on the action surface as to travel (propagate, advance) in a first direction d1 and a second state of causing the electromagnetic waves to travel (propagate, advance) in a second direction d2. In the first embodiment, the first state is a first reflecting state of reflecting the electromagnetic waves incident on the action surface as towards the first direction d1. The second state is a second reflecting state of reflecting the electromagnetic waves incident on the action surface as towards the second direction d2.

In greater detail, the advancing unit 14 of the first embodiment includes a reflecting surface that reflects the electromagnetic waves on each pixel px. The advancing unit 14 switches each pixel px between the first reflecting state and the second reflecting state by changing the direction of the reflecting surface of each pixel px. In the first embodiment, the advancing unit 14 includes a digital micro mirror device (DMD), for example. The DMD can drive minute reflecting surfaces that configure the action surface as to switch the reflecting surface on each pixel px between inclined states of +12° and −12° relative to the action surface as. The action surface as is parallel to the board surface of a substrate on which the minute reflecting surfaces are mounted in the DMD.

Figure 2:
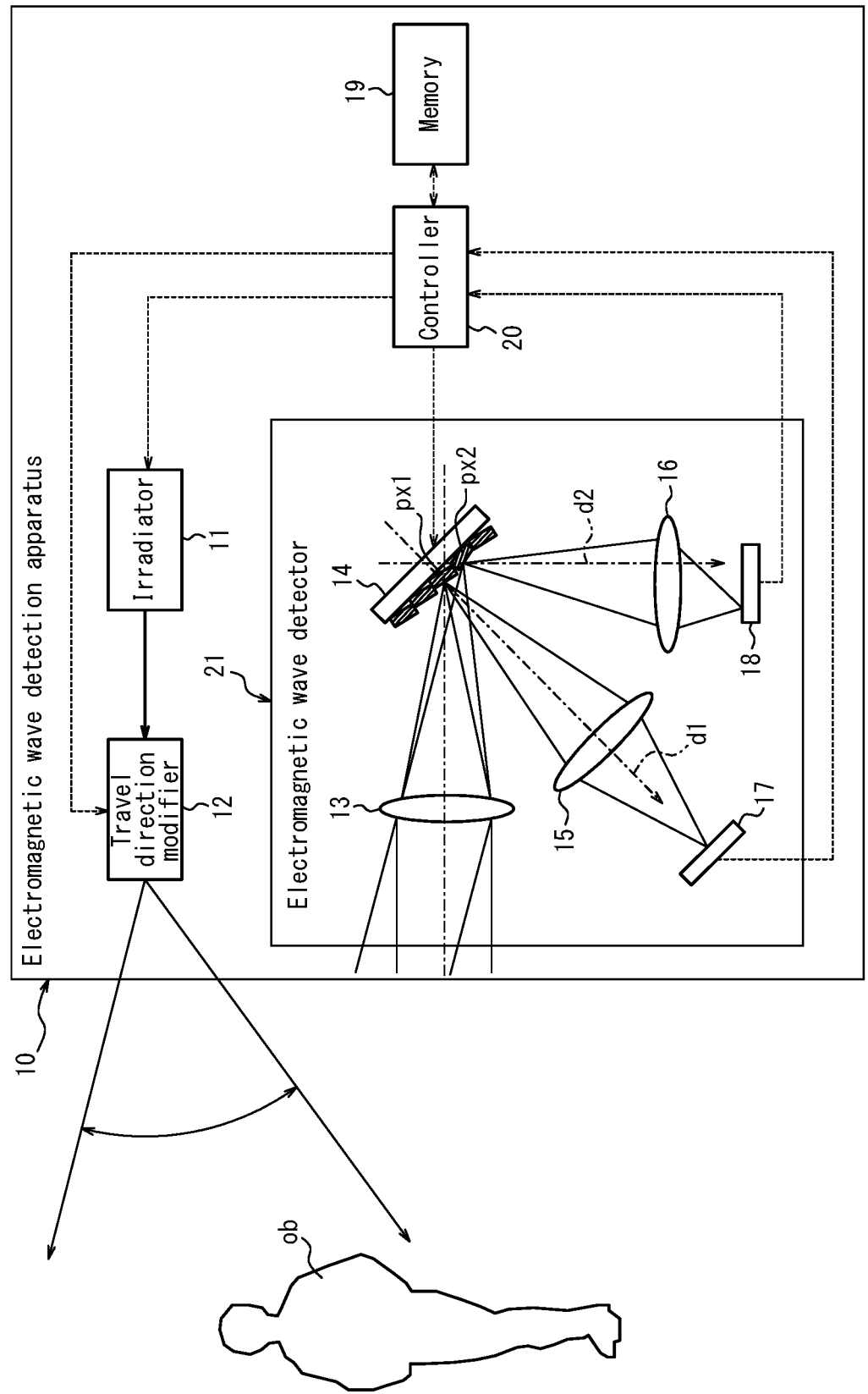
FIG. 2 is a configuration diagram of the electromagnetic wave detection apparatus to illustrate the travel direction of electromagnetic waves in a first state and a second state of pixels in an advancing unit of the electromagnetic wave detection apparatus of FIG. 1.

The advancing unit 14 switches each pixel px between the first state and the second state based on control by the controller 20, described below. For example, as illustrated in FIG. 2, the advancing unit 14 can simultaneously cause electromagnetic waves incident on a portion of pixels px1 to travel (propagate, advance) in the first direction d1 by switching the pixels px1 to the first state and cause electromagnetic waves incident on another portion of pixels px2 to travel (propagate, advance) in the second direction d2 by switching the pixels px2 to the second state. The advancing unit 14 can also cause the electromagnetic waves incident on the same pixel px to travel (propagate, advance) in the second direction d2 after the first direction d1 by switching the pixel px from the first state to the second state.

In the first state, each pixel px of the advancing unit 14 causes the reflected waves of electromagnetic waves irradiated onto the object ob to travel (propagate, advance) towards different detection elements of the first detector 17, described below, by irradiation position.

As illustrated in FIG. 1, the first post-stage optical system 15 is provided in the first direction d1 from the advancing unit 14. The first post-stage optical system 15 includes either or both of a lens and a mirror, for example. The first post-stage optical system 15 forms an image of the object ob represented by the electromagnetic waves whose travel direction is switched at the advancing unit 14.

The second post-stage optical system 16 is provided in the second direction d2 from the advancing unit 14. The second post-stage optical system 16 includes either or both of a lens and a mirror, for example. The second post-stage optical system 16 forms an image of the object ob represented by the electromagnetic waves whose travel direction is switched at the advancing unit 14.

The first detector 17 is provided along the path of electromagnetic waves that travel (propagate, advance) through the first post-stage optical system 15 after traveling (propagating, advancing) in the first direction d1 due to the advancing unit 14. The first detector 17 detects electromagnetic waves that pass through the first post-stage optical system 15, i.e. electromagnetic waves that travel (propagate, advance) in the first direction d1.

The first detector 17 is a passive sensor that includes a plurality of detection elements. The detection elements are arranged in a plane perpendicular to the optical axis of the first post-stage optical system 15. In greater detail, the first detector 17 in the first embodiment includes a device array. For example, the first detector 17 includes an imaging device such as an image sensor or an imaging array, captures the image formed from electromagnetic waves at a detection surface, and generates image information corresponding to the imaged object ob. In greater detail, the first detector 17 in the first embodiment captures a visible light image. The first detector 17 in the first embodiment transmits the generated image information to the controller 20 as a signal.

The first detector 17 detects the reflected waves of the electromagnetic waves irradiated onto the object ob from the irradiator 11 via the travel direction modifier 12, captures an image formed by the detected electromagnetic waves, and generates image information corresponding to the captured object ob. The detection elements detect the electromagnetic waves by irradiation position on the object ob.

The first detector 17 may capture an image other than a visible light image. The first detector 17 may include a thermo sensor. In this configuration, the electromagnetic wave detection apparatus 10 can acquire temperature information with the first detector 17.

In this way, the first detector 17 in the first embodiment includes a device array. Therefore, when an image is formed on the detection surface by incident electromagnetic waves, the image formed by the electromagnetic waves is incident on each detection element of the first detector 17 in the first embodiment, allowing an improvement in resolution. The first detector 17 is therefore preferably provided at a secondary image formation position, which is a position of image formation by the first post-stage optical system 15.

The second detector 18 is provided along the path of electromagnetic waves that travel (propagate, advance) through the second post-stage optical system 16 after traveling (propagating, advancing) in the second direction d2 due to the advancing unit 14. The second detector 18 detects electromagnetic waves that pass through the second post-stage optical system 16, i.e. electromagnetic waves that travel (propagate, advance) in the second direction d2.

In the first embodiment, the second detector 18 is an active sensor that detects reflected waves, from the object ob, of electromagnetic waves irradiated towards the object ob from the irradiator 11. The second detector 18 in the first embodiment detects reflected waves, from the object ob, of electromagnetic waves irradiated towards the object ob after being irradiated from the irradiator 11 and reflected by the travel direction modifier 12.

In greater detail, the second detector 18 of the first embodiment includes a device configured as a ranging sensor. For example, the second detector 18 includes a single device such as an Avalanche PhotoDiode (APD), a PhotoDiode (PD), or a ranging image sensor. The second detector 18 may include a device array, such as an APD array, a PD array, a ranging imaging array, or a ranging image sensor. The second detector 18 of the first embodiment transmits detection information, indicating the detection of reflected waves from the subject, to the controller 20 as a signal. In greater detail, the second detector 18 detects electromagnetic waves in the infrared light band. Accordingly, the second detector 18 in the first embodiment cooperates with the travel direction modifier 12 to form a scanning-type ranging sensor.

It suffices for the single device configured as the above-described ranging sensor in the second detector 18 to be capable of detecting electromagnetic waves. Image formation at the detection surface is not required. The second detector 18 therefore need not be provided at a secondary image formation position, which is a position of image formation by the second post-stage optical system 16. In other words, as long as electromagnetic waves from all angles of view can be incident on the detection surface, the second detector 18 with this configuration may be disposed at any position along the path of electromagnetic waves that travel (propagate, advance) in the second direction d2, due to the advancing unit 14, and subsequently pass through the second post-stage optical system 16.

The memory 19 may be configured by a semiconductor memory, a magnetic memory, or the like. The memory 19 stores a variety of information, data, programs for causing the electromagnetic wave detection apparatus 10 to operate, and the like. The memory 19 also functions as a working memory.

For example, the memory 19 stores first related information that associates drive signals and orientations of the reflecting surface. The first related information is, for example, the relationship between the drive signal and the orientation of the reflecting surface, i.e. the orientation of the reflecting surface as a function of the drive signal or vice-versa. The first related information is, for example, the orientation of the reflecting surface corresponding individually to a plurality of signal values of the drive signal, or the signal value of the drive signal corresponding individually to a plurality of orientations of the reflecting surface. FIG. 3 illustrates an example of the first related information.

The memory 19 also stores second related information that associates the orientation of the reflecting surface and the position of the detection element that, as a result of the orientation of the reflecting surface, detects the reflected waves reflected at the irradiation position irradiated by the electromagnetic waves. The second related information is, for example, the relationship between the orientation of the reflecting surface and the position of the detection element, i.e. the position of the detection element as a function of the orientation of the reflecting surface or vice-versa. The second related information is, for example, the orientation of the reflecting surface corresponding individually to a plurality of positions of detection elements, or the position of the detection element corresponding individually to a plurality of orientations of the reflecting surface. FIG. 4 illustrates an example of the second related information.

The controller 20 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 20 may include either or both of a system-on-a-chip (SoC) and a system in a package (SiP) that have one processor or a plurality of processors working together.

The controller 20 acquires information related to the surroundings of the electromagnetic wave detection apparatus 10 based on electromagnetic waves detected by each of the first detector 17 and the second detector 18. The information related to the surroundings may, for example, be image information, distance information, and temperature information.

In the first embodiment, the controller 20 acquires image information in the form of electromagnetic waves detected as an image by the first detector 17, as described above. Based on the detection information detected by the second detector 18, the controller 20 in the first embodiment also uses the time-of-flight (TOF) method to acquire distance information of the irradiation position irradiated by the irradiator 11.

As illustrated in FIG. 5, the controller 20 causes the irradiator 11 to emit pulses of electromagnetic waves by inputting an electromagnetic wave emission signal to the irradiator 11 (see the "electromagnetic wave emission signal" section). The irradiator 11 irradiates electromagnetic waves based on the inputted electromagnetic wave emission signal (see the "irradiator emission amount" section). The electromagnetic waves emitted by the irradiator 11 and reflected by the travel direction modifier 12 to be irradiated on an arbitrary irradiation region are reflected in the irradiation region.

The controller 20 may, for example, include a time measurement large scale integrated circuit (LSI) and measure a time $\Delta T$ from a timing T1 at which the controller 20 caused the irradiator 11 to emit electromagnetic waves to a timing T2 at which the controller 20 acquires the detection information (see the "detection information acquisition" section). The controller 20 multiplies the time $\Delta T$ by the speed of light and divides by two to calculate the distance to the irradiation position.

The controller 20 outputs the drive signal to the travel direction modifier 12. The controller 20 also reads the first related information from the memory 19. The controller 20 calculates the irradiation position based on outputted drive information and the first related information. By calculating the distance to the irradiation position while changing the irradiation position using the drive signal, the controller 20 creates distance information in the image information acquired from the first detector 17.

In the first embodiment, the electromagnetic wave detection apparatus 10 is configured to create distance information by direct ToF, in which the time is directly measured from when laser light is irradiated until the laser light returns. The electromagnetic wave detection apparatus 10 is not, however, limited to this configuration. For example, the electromagnetic wave detection apparatus 10 may create distance information by flash ToF, in which electromagnetic waves are irradiated with a constant period, and the time until return is measured indirectly from the phase difference between the irradiated electromagnetic waves and the returning electromagnetic waves. The electromagnetic wave detection apparatus 10 may also create distance information by another ToF method, such as phased ToF.

The controller 20 controls the irradiator 11, the travel direction modifier 12, the advancing unit 14, the first detector 17, and the second detector 18 to repeatedly acquire the image information and the distance information. The control of each portion to repeatedly acquire the image information and the distance information is described below with reference to the timing chart in FIG. 6.

Figure 7:
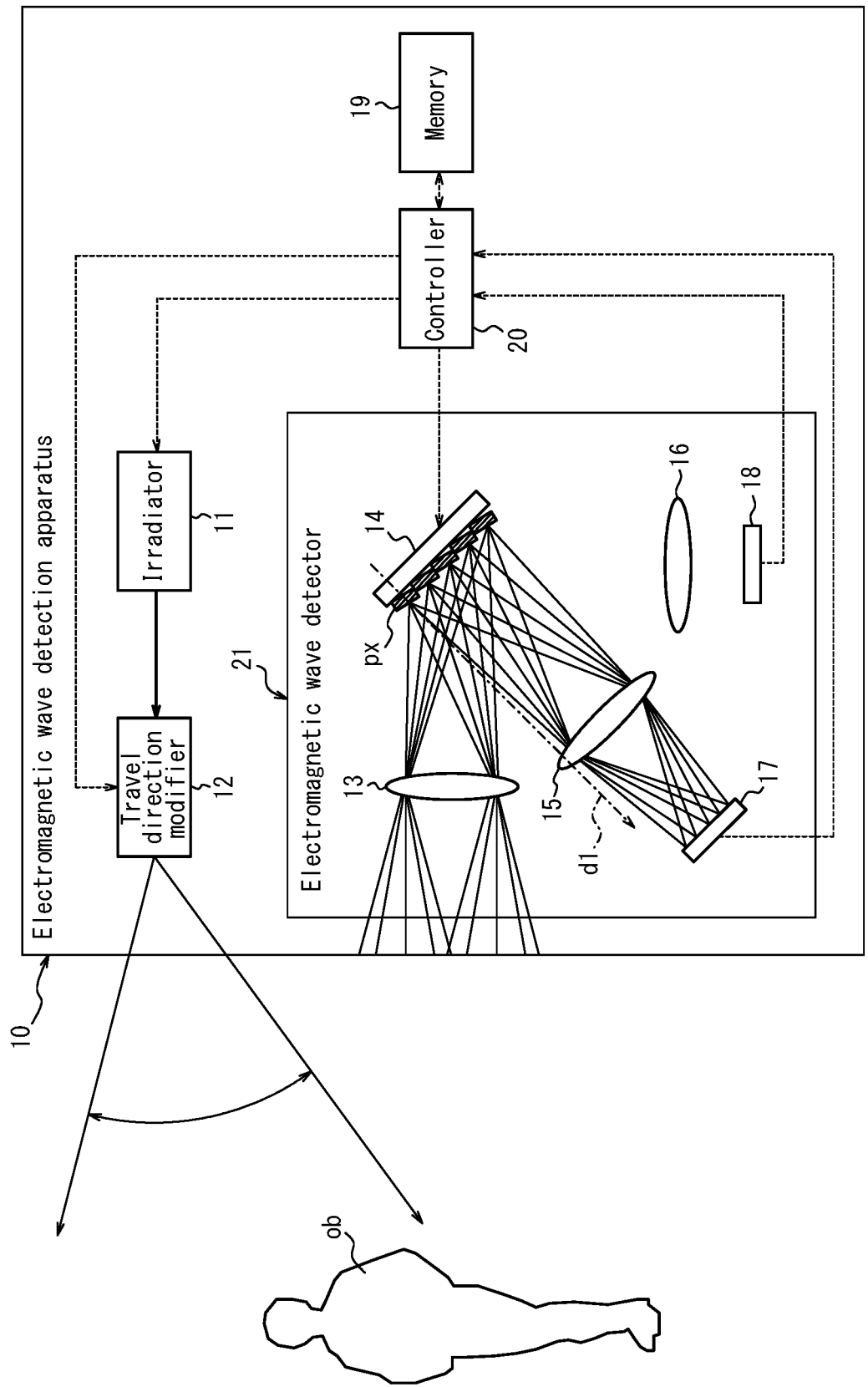
FIG. 7 is a configuration diagram of the electromagnetic wave detection apparatus to illustrate the travel state of electromagnetic waves when arbitrary pixels of the advancing unit in the first embodiment are in the first state.

At timing t1, the controller 20 causes the first detector 17 to start detecting electromagnetic waves for generating image information of a first frame. At timing t1, all of the pixels px of the advancing unit 14 are in the first state, and the electromagnetic waves incident on the pre-stage optical system 13 reach the first detector 17 (see FIG. 7). At timing t1, the controller 20 also starts the switching of the first pixel px in the advancing unit 14 from the first state to the second state (see "drive signal for first pixel of advancing unit" section), as illustrated in FIG. 6. At timing t1, all of the other pixels px remain in the first state (see "state of second pixel of advancing unit", "state of $N^{th}$ pixel of advancing unit" sections).

Figure 8:
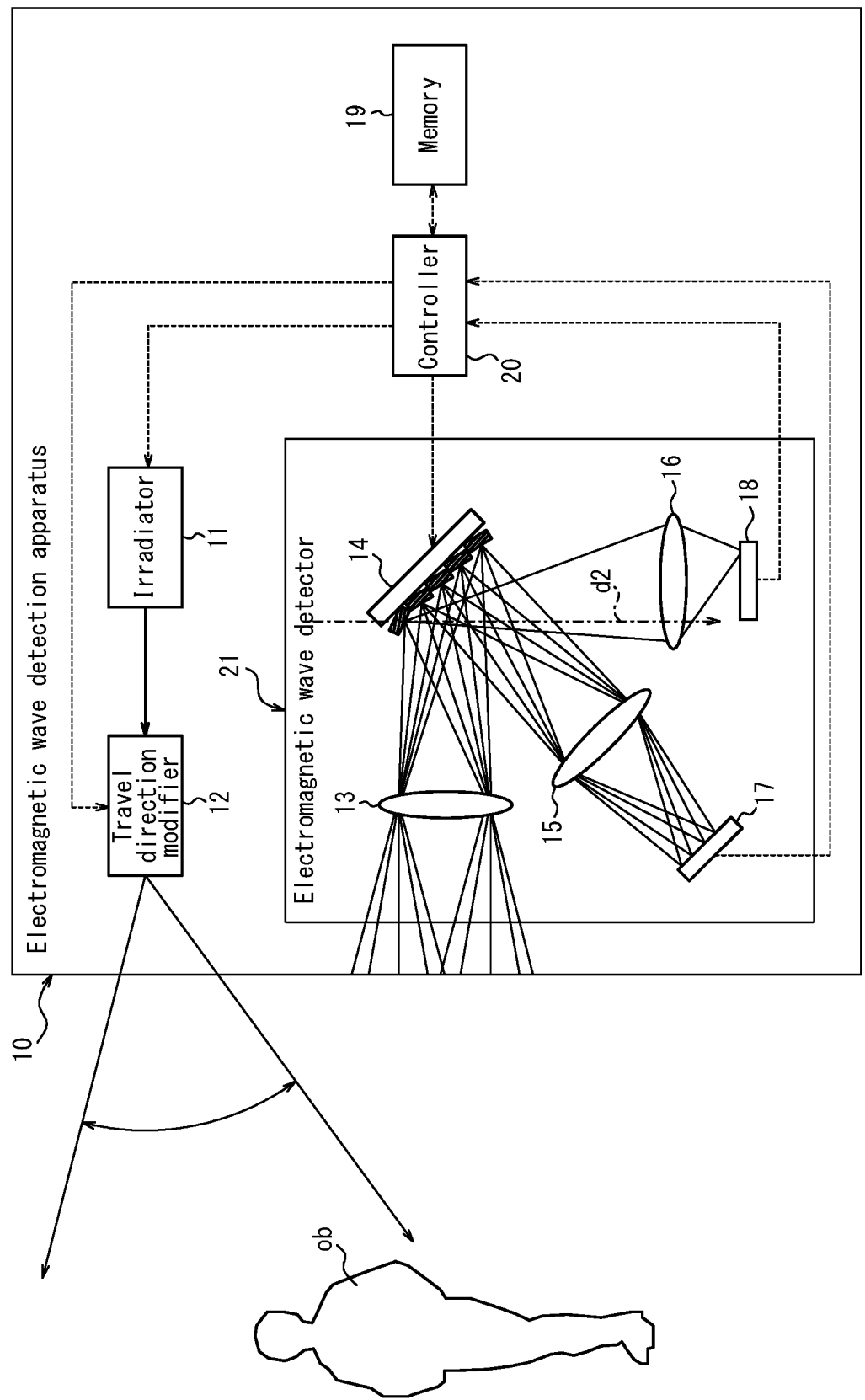
FIG. 8 is a configuration diagram of the electromagnetic wave detection apparatus to illustrate the travel state of electromagnetic waves when only the arbitrary pixels of FIG. 5 are in the second state.

At timing t2, which is when switching of the first pixel px of the advancing unit 14 from the first state to the second state is complete (see "state of first pixel of advancing unit" section), the controller 20 causes the irradiator 11 to emit electromagnetic waves (see "electromagnetic wave emission timing" section). At timing t2, the first pixel px of the advancing unit 14 switches from the first state (see FIG. 7) to the second state, and the electromagnetic waves that are incident on the pre-stage optical system 13 and form an image on the first pixel px of the advancing unit 14 travel (propagate, advance) in the second direction d2 after the first direction d1 (see FIG. 8).

As illustrated in FIG. 6, the controller 20 causes the second detector 18 to detect electromagnetic waves at timing t2 (see "second detector detection timing" section). The time it takes from when the irradiator 11 irradiates the electromagnetic waves until the electromagnetic waves reach the electromagnetic wave detection apparatus 10 is extremely short compared to the detection time for generating the image information and is, for example, on the order of nanoseconds. Therefore, detection of electromagnetic waves by the second detector 18 is complete in a negligible time and is considered to be the timing t2. The controller 20 acquires the distance information at the irradiation position corresponding to the first pixel px of the advancing unit 14 by calculation based on the drive signal transmitted to the travel direction modifier 12 at timing t2.

Furthermore, at timing t2, the controller 20 starts the switching of the first pixel px in the advancing unit 14 from the second state to the first state (see "drive signal for first pixel of advancing unit" section). In this way, the controller 20 switches the first pixel px in the advancing unit 14 from the second state to the first state and can thereby cause the element in the first detector 17 corresponding to the first pixel px to detect the electromagnetic waves (visible light) again.

At timing t3, which is when switching of the first pixel px of the advancing unit 14 from the second state to the first state is complete (see "state of first pixel of advancing unit" section), the controller 20 starts the switching of the second pixel px in the advancing unit 14 from the first state to the second state (see "drive signal for second pixel of advancing unit" section). At timing t3, all of the other pixels px remain in the first state (see "state of first pixel of advancing unit", "state of $N^{th}$ pixel of advancing unit" sections).

At timing t4, which is when switching of the second pixel px of the advancing unit 14 from the first state to the second state is complete (see "state of second pixel of advancing unit" section), the controller 20 causes the irradiator 11 to emit electromagnetic waves (see "electromagnetic wave emission timing" section). At timing t4, the second pixel px of the advancing unit 14 switches from the first state to the second state, and the electromagnetic waves that are incident on the pre-stage optical system 13 and form an image on the second pixel px of the advancing unit 14 travel (propagate, advance) in the second direction d2 after the first direction d1. The controller 20 causes the second detector 18 to detect electromagnetic waves at timing t4 (see "second detector detection timing" section). The controller 20 acquires the distance information at the irradiation position corresponding to the second pixel px of the advancing unit 14 by calculation based on the drive signal transmitted to the travel direction modifier 12 at timing t4.

Furthermore, at timing t4, the controller 20 starts the switching of the second pixel px in the advancing unit 14 from the second state to the first state (see "drive signal for second pixel of advancing unit" section). In this way, the controller 20 switches the second pixel px in the advancing unit 14 from the second state to the first state and can thereby cause the device in the first detector 17 corresponding to the second pixel px to detect the electromagnetic waves (visible light) again.

The controller 20 subsequently switches the third pixel px to the $N^{th}$ pixel px in the advancing unit 14 in order, in the same way as the first pixel px, from the first state to the second state and from the second state to the first state. Image information of the first frame is thereby acquired, as is distance information at the irradiation position corresponding to each pixel px.

As described above, the controller 20 is configured to perform control to start switching of the $M^{th}$ pixel px from the first state to the second state at the timing at which switching of the $(M-1)^{th}$ pixel px from the second state to the first state is complete. In this configuration, the advancing unit 14 can switch $T_{img}/T_{dis}$ pixels px from the first state to the second state in a time $T_{img}$ for generating one frame of image information. In other words, the controller 20 can generate distance information for $T_{img}/T_{dis}$ pixels px in the time $T_{img}$. M is an integer satisfying $2 \leq M \leq N$. $T_{dis}$ is the sum of the time required for switching a pixel px of the advancing unit 14 from the first state to the second state and the time required to return from the second state to the first state. In other words, $T_{dis}$ is the time required to switch an arbitrary pixel px in order from the first state to the second state and back to the first state. In the first embodiment, $T_{img}$ is 1/60 s, for example, and $T_{dis}$ is 1/3000 s.

In a configuration in which the value of $T_{img}/T_{dis}$ is less than the number of pixels in the advancing unit 14, the controller 20 cannot switch all of the pixels px in the advancing unit 14 during the time $T_{img}$. Therefore, during the generation of one frame of image information, the controller 20 cannot generate distance information corresponding to the frame of image information. In other words, during the generation of one frame of image information, the controller 20 can only generate distance information corresponding to less than the frame of image information (for example, 0.5 frames).

To address this issue in a configuration in which the value of $T_{img}/T_{dis}$ is less than the number of pixels in the advancing unit 14, the controller 20 selects a smaller number of pixels px than $T_{img}/T_{dis}$ as targets of switching from among all of the pixels px in the advancing unit 14. Furthermore, the controller 20 transmits a drive signal to the travel direction modifier 12 so that, at the timing of switching to the second state for each pixel px selected as a target of switching, electromagnetic waves are irradiated onto a region corresponding to the pixel px within the irradiation region.

In a configuration in which the value of $T_{img}/T_{dis}$ is less than the number of pixels in the advancing unit 14, the controller 20 may also perform control so that switching of all pixels px in the advancing unit 14 is complete during a time $P \times T_{img}$ for generating the image information of a plurality of frames (P frames, where P is a positive number satisfying P>1). Furthermore, the controller 20 transmits a drive signal to the travel direction modifier 12 so that, at the timing of switching of each pixel px of the advancing unit 14, electromagnetic waves are irradiated onto a region corresponding to the pixel px within the irradiation region.

In a configuration in which the value of $T_{img}/T_{dis}$ is less than the number of pixels in the advancing unit 14, the controller 20 may divide all of the pixels px in the advancing unit 14 into groups of $T_{img}/T_{dis}$ or fewer pixels px and collectively switch pixels px group by group. Furthermore, the controller 20 may transmit a drive signal to the travel direction modifier 12 so that, at the timing of switching of a pixel px at a position representative of each group (for example, the central position of each group), electromagnetic waves are irradiated onto a region corresponding to the pixel px within the irradiation region.

In a configuration in which the value of $T_{img}/T_{dis}$ is less than the number of pixels in the advancing unit 14, the controller 20 may divide all of the pixels px in the advancing unit 14 into groups of $T_{img}/T_{dis}$ or fewer pixels px and switch only a certain pixel px in each group. Furthermore, the controller 20 may transmit a drive signal to the travel direction modifier 12 so that, at the timing of switching of the certain pixel px, electromagnetic waves are irradiated onto a region corresponding to the pixel px within the irradiation region.

The detection element in the first detector 17 corresponding to a pixel px, of the advancing unit 14, switched to the second state during the capturing time of an image of one frame cannot receive light while the pixel px is in the second state. Therefore, the signal strength dependent on this detection element in the first detector 17 is reduced. The controller 20 may therefore compensate for the reduced signal strength by multiplying the signal value of the detection element in the first detector 17 by a gain. The capturing time of an image of one frame corresponds to the time when the first detector 17 detects electromagnetic waves for generating one frame of image information.

In a configuration in which the scanning rate by the travel direction modifier 12 is faster than the switching rate of a pixel px, i.e. when $T_{scn}$ is shorter than $T_{dis}$, the controller 20 may start switching of the $M^{th}$ pixel px from the first state to the second state before the timing at which switching of the $(M-1)^{th}$ pixel px from the second state to the first state is complete. $T_{scn}$ is the time required for the irradiation position of electromagnetic waves emitted from the irradiator 11 and reflected by the travel direction modifier 12 to change from a certain irradiation position to the next irradiation position, or the time required to change from a certain irradiation position to an adjacent irradiation position. In this configuration, distance information can be generated at more pixels in a shorter time than when another pixel is switched to the second state only after switching of an arbitrary pixel px from the second state to the first state is complete.

The controller 20 starts detection of electromagnetic waves for generating image information of a second frame at t5, which is when the time $T_{img}$ required to generate image information of the first frame has elapsed from timing t1 (see "first detector detection timing" section). After detection of electromagnetic waves by the first detector 17 from timing t1 to t5 is finished, the controller 20 acquires the image information of the first frame based on the electromagnetic waves detected during that time. Subsequently, the controller 20 controls the irradiator 11, the travel direction modifier 12, the advancing unit 14, the first detector 17, and the second detector 18 to acquire the image information and the distance information in the same way as the control from timing t1 to t5.

The controller 20 also controls the irradiator 11, the travel direction modifier 12, the advancing unit 14, and the first detector 17 to update the first related information. The control of each component to update the first related information is described below.

To update the first related information, the controller 20 switches all of the pixels px of the advancing unit 14 to the first reflecting state. The controller 20 transmits a drive signal with an arbitrary signal value to the travel direction modifier 12. The controller 20 causes the first detector 17 to detect reflected waves of the electromagnetic waves. The controller 20 distinguishes the position of the detection element, among the plurality of detection elements, that detects the reflected waves. When a plurality of detection elements detects the reflected waves, the controller 20 distinguishes the position of the detection element for which the strength of the reflected waves that are detected is greatest.

The controller 20 reads the second related information from the memory 19. Based on the second related information, the controller 20 calculates the orientation of the reflecting surface associated with the distinguished position of the detection element. The controller 20 stores a combination of the calculated orientation of the reflecting surface and the signal value of the transmitted drive signal in the memory 19. For each drive signal among drive signals of a plurality of signal values, the controller 20 calculates the orientation of the reflecting surface to yield a combination of the signal value and the orientation of the reflecting surface. The controller 20 updates the first related information based on a plurality of these combinations.

For example, when the first related information is a function yielding the orientation of the reflecting surface as a function of the drive signal, the controller 20 updates the function based on the plurality of combinations. The controller 20 stores the updated function as the new relationship between the drive signal and the orientation of the reflecting surface, i.e. as the new first related information, in the memory 19.

When, for example, the first related information is the orientation of the reflecting surface corresponding individually to a plurality of signal values of the drive signal, the controller 20 stores the orientation of the reflecting surface in each combination stored in the memory 19 as the new orientation of the reflecting surface associated with each corresponding signal value, i.e. as the new first related information, in the memory 19.

When, for example, the first related information is the signal value of the drive signal corresponding individually to a plurality of orientations of the reflecting surface, the controller 20 stores the signal value in each combination stored in the memory 19 as the new signal value associated with each corresponding orientation of the reflecting surface, i.e. as the new first related information, in the memory 19.

Figure 9:
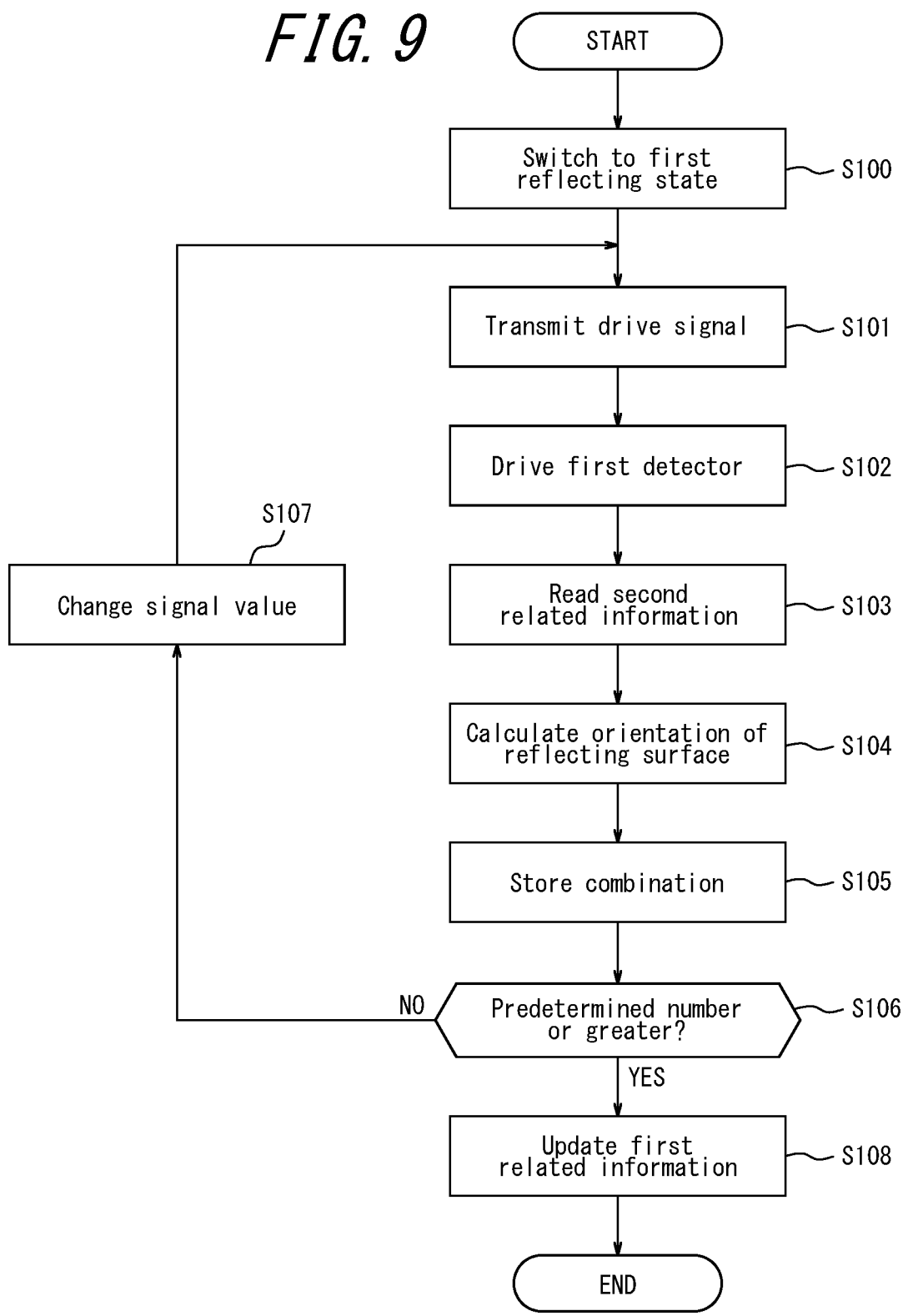
FIG. 9 is a flowchart illustrating processing, executed by the controller in the first embodiment, to update the first related information.

Next, the processing executed by the controller 20 in the first embodiment to update the first related information is described with reference to the flowchart of FIG. 9. The controller 20 starts the processing to update the first related information when, for example, an input interface of the electromagnetic wave detection apparatus 10 detects an operation to execute the update processing.

In step S100, the controller 20 switches all of the pixels px of the advancing unit 14 to the first reflecting state. When the controller 20 has switched all of the pixels px to the first reflecting state, the process proceeds to step S101.

In step S101, the controller 20 transmits a drive signal with an arbitrary signal value to the travel direction modifier 12 to cause electromagnetic waves to be irradiated on the irradiation position corresponding to the signal value. After the controller 20 transmits the drive signal, the process proceeds to step S102.

In step S102, the controller 20 drives the first detector 17 to capture an image. The controller 20 acquires image information generated by capturing of the image. In the acquired image information, the controller 20 distinguishes the position of the detection element for which the strength of the reflected waves that were detected is greatest. After the controller 20 distinguishes the position of the detection element, the process proceeds to step S103.

In step S103, the controller 20 reads the second related information from the memory 19. After the controller 20 reads the second related information, the process proceeds to step S104.

In step S104, the controller 20 uses the second related information read in step S103 to calculate the orientation of the reflecting surface corresponding to the position of the detection element distinguished in step S102. After the controller 20 calculates the orientation of the reflecting surface, the process proceeds to step S105.

In step S105, the controller 20 stores a combination of the signal value of the drive signal transmitted in step S101 and the orientation of the reflecting surface calculated in step S104 in the memory 19. After the controller 20 stores the combination, the process proceeds to step S106.

In step S106, the controller 20 judges whether the number of combinations stored in step S105 is a predetermined number or greater. When the number of combinations is not the predetermined number or greater, the process proceeds to step S107. When the number of combinations is the predetermined number or greater, the process proceeds to step S108.

In step S107, the controller 20 changes the signal value of the drive signal. After the controller 20 changes the signal value, the process returns to step S101.

In step S108, the controller 20 uses the combinations stored in step S105 to update the first related information stored in the memory 19. After updating the first related information, the controller 20 ends the update processing.

The electromagnetic wave detection apparatus 10 of the first embodiment with the above configuration updates the first related information based on the position of the detection element that detects reflected waves of electromagnetic waves when the drive signal is outputted to the travel direction modifier 12. This configuration allows the electromagnetic wave detection apparatus 10 of the first embodiment to reduce the difference between the orientation of the reflecting surface estimated from the signal values of the drive signal and the actual orientation of the reflecting surface. Therefore, the electromagnetic wave detection apparatus 10 of the first embodiment can reduce the difference between the actual emission direction of electromagnetic waves and the emission direction of electromagnetic waves estimated from the signal values of the drive signal. The effects of such a configuration are the same for the electromagnetic wave detection apparatus 10 of the second embodiment, described below.

The electromagnetic wave detection apparatus 10 of the first embodiment with the above configuration can switch each pixel px disposed on the action surface as of the advancing unit 14 between the first state and the second state. The electromagnetic wave detection apparatus 10 of the first embodiment with this configuration can align the optical axis of the pre-stage optical system 13 with the optical axis of the first post-stage optical system 15 in the first direction d1, in which electromagnetic waves are caused to travel (propagate, advance) in the first state, and with the optical axis of the second post-stage optical system 16 in the second direction d2, in which electromagnetic waves are caused to travel (propagate, advance) in the second state. Accordingly, the electromagnetic wave detection apparatus 10 of the first embodiment can reduce the misalignment between the optical axes of the first detector 17 and the second detector 18 by switching the pixels px of the advancing unit 14 between the first state and the second state. The electromagnetic wave detection apparatus 10 of the first embodiment can thereby reduce the misalignment of detection axes in the first detector 17 and the second detector 18. Therefore, the electromagnetic wave detection apparatus 10 of the first embodiment can reduce the misalignment of coordinate systems in the detection results of the first detector 17 and the second detector 18.

The electromagnetic wave detection apparatus 10 of the first embodiment can switch a portion of the pixels px in the advancing unit 14 to the first state and switch another portion of the pixels px to the second state. Accordingly, the electromagnetic wave detection apparatus 10 of the first embodiment can cause the first detector 17 to detect electromagnetic waves at a portion of pixels px while simultaneously causing the second detector 18 to detect electromagnetic waves at another portion of pixels px. The electromagnetic wave detection apparatus 10 of the first embodiment can thereby simultaneously acquire information relating to different regions.

The electromagnetic wave detection apparatus 10 of the first embodiment can switch the same pixel px in the advancing unit 14 to the first state and then to the second state. With this configuration, the first detector 17 can detect electromagnetic waves when the pixel px in the advancing unit 14 is in the first state, and immediately thereafter, the second detector 18 can detect electromagnetic waves when the pixel px is in the second state. The electromagnetic wave detection apparatus 10 of the first embodiment can therefore reduce the misalignment in the timing of electromagnetic wave detection by the first detector 17 and the second detector 18 for the same pixel px in the advancing unit 14. The electromagnetic wave detection apparatus 10 of the first embodiment can thereby reduce misalignment in the timing at which information relating to the same region is acquired.

The electromagnetic wave detection apparatus 10 of the first embodiment includes the irradiator 11. Accordingly, by irradiating electromagnetic waves onto the object ob, the electromagnetic wave detection apparatus 10 of the first embodiment can cause the second detector 18 to function as an active sensor. The electromagnetic wave detection apparatus 10 of the first embodiment can also cause the first detector 17 to function as a passive sensor. With this configuration, the electromagnetic wave detection apparatus 10 of the first embodiment can switch at least one of the pixels px in the advancing unit 14 from the first state to the second state to cause both an active sensor and a passive sensor to acquire information relating to the same region.

Furthermore, with this configuration, the electromagnetic wave detection apparatus 10 of the first embodiment can switch a portion of the pixels px in the advancing unit 14 to the first state and switch another portion of the pixels px to the second state to separate the region in which the active sensor acquires information from the region in which the passive sensor acquires information.

The electromagnetic wave detection apparatus 10 of the first embodiment includes the travel direction modifier 12. With this configuration, the electromagnetic wave detection apparatus 10 can scan the object ob using electromagnetic waves emitted by the irradiator 11. In other words, the electromagnetic wave detection apparatus 10 of the first embodiment can cause the second detector 18 to cooperate with the travel direction modifier 12 and function as a scanning-type active sensor. Accordingly, the electromagnetic wave detection apparatus 10 of the first embodiment can use the second detector 18 to acquire information in accordance with positions in one or two dimensions.

Next, an electromagnetic wave detection apparatus according to a second embodiment of the present disclosure is described. In the second embodiment, the type of information that the memory stores and the method of updating the first related information by the controller differ from the first embodiment. The second embodiment is described below, focusing on the differences from the first embodiment. The same reference signs are used for components with the same configuration as in the first embodiment.

In the second embodiment (see FIG. 1), the memory 19 stores third related information that associates the position of each pixel px in the advancing unit 14 with the position of a detection element in the first detector 17 to which the pixel px causes the reflected waves of the electromagnetic waves to travel (propagate, advance). In greater detail, the third related information is information associating the position of each pixel px with the position of the detection element that detects the electromagnetic waves that are reflected in the first direction d1 by the pixel px and from which an image is formed by the first post-stage optical system 15. The third related information is, for example, the relationship between the position of each pixel px and the position of the detection element, i.e. the position of the detection element as a function of the position of each pixel px or vice-versa. The third related information is, for example, the position of each pixel px corresponding individually to a plurality of positions of detection elements, or the position of each detection element corresponding individually to a plurality of positions of pixels px. FIG. 10 illustrates an example of the third related information.

The memory 19 also stores fourth related information that associates the orientation of the reflecting surface and the position of the pixel px in the advancing unit 14 on which reflected waves, from the irradiation position irradiated by electromagnetic waves due to the reflecting surface, are incident.

The fourth related information is, for example, the relationship between the orientation of the reflecting surface and the position of the pixel px, i.e. the position of the pixel px as a function of the orientation of the reflecting surface or the orientation of the reflecting surface as a function of the position of the pixel px. The fourth related information is, for example, the orientation of the reflecting surface corresponding individually to a plurality of positions of pixels px, or the position of the pixel px corresponding individually to a plurality of orientations of the reflecting surface. FIG. 11 illustrates an example of the fourth related information.

To update the first related information, the controller 20 switches all of the pixels px of the advancing unit 14 to the first reflecting state, as in the first embodiment. The controller 20 transmits a drive signal with an arbitrary signal value to the travel direction modifier 12. The controller 20 causes the first detector 17 to detect reflected waves of the electromagnetic waves. The controller 20 distinguishes the position of the detection element, among the plurality of detection elements, that detects the reflected waves. When a plurality of detection elements detects the reflected waves, the controller 20 distinguishes the position of the detection element for which the strength of the reflected waves that are detected is greatest.

In the second embodiment, the controller 20 reads the third related information from the memory 19. Based on the third related information, the controller 20 calculates the position of the pixel px of the advancing unit 14 associated with the distinguished position of the detection element. Next, the controller 20 reads the fourth related information from the memory 19. Based on the fourth related information, the controller 20 calculates the orientation of the reflecting surface associated with the calculated position of the pixel px. Subsequently, as in the first embodiment, the controller 20 stores a combination of the calculated orientation of the reflecting surface and the arbitrary signal value of the transmitted drive signal in the memory 19. In the same way, the controller 20 updates the first related information based on a plurality of combinations of the signal value and the calculated orientation of the reflecting surface.

Figure 12:
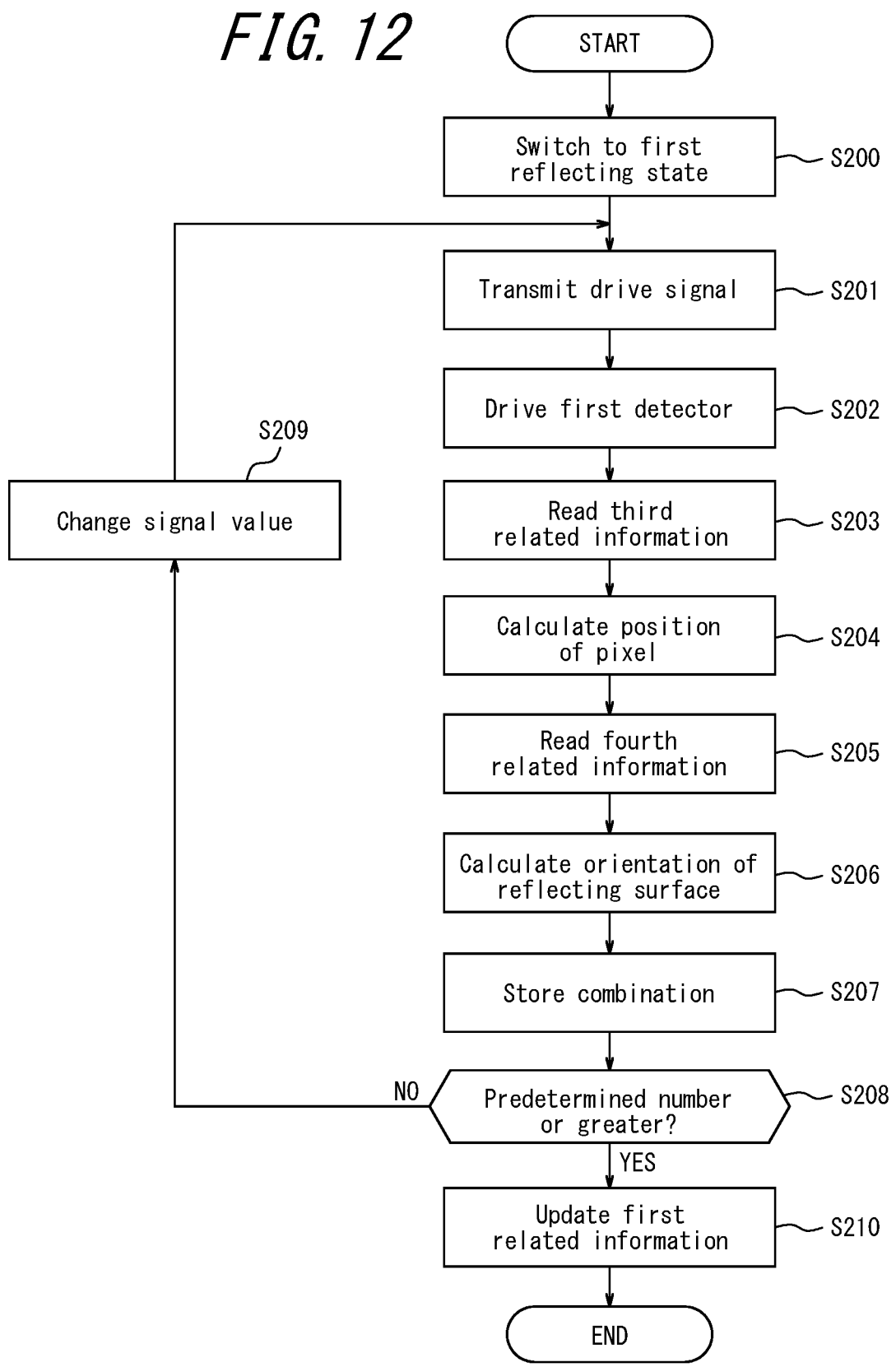
FIG. 12 is a flowchart illustrating processing, executed by the controller in the second embodiment, to update the first related information.

Next, the processing executed by the controller 20 in the second embodiment to update the first related information is described with reference to the flowchart of FIG. 12. The controller 20 starts the processing to update the first related information when, for example, an input interface of the electromagnetic wave detection apparatus 10 detects an operation to execute the update processing.

In steps 5200 to 5202, the controller 20 executes the same operations as in steps S100 to S102 of the processing executed by the controller 20 in the first embodiment to update the first related information. After the controller 20 distinguishes the position of the detection element in step S202, the process proceeds to step S203.

In step S203, the controller 20 reads the third related information from the memory 19. After the controller 20 reads the third related information, the process proceeds to step S204.

In step S204, the controller 20 uses the third related information read in step S203 to calculate the position of the pixel px corresponding to the position of the detection element distinguished in step S202. After the controller 20 calculates the position of the pixel px, the process proceeds to step S205.

In step S205, the controller 20 reads the fourth related information from the memory 19. After the controller 20 reads the fourth related information, the process proceeds to step S206.

In step S206, the controller 20 uses the fourth related information read in step S205 to calculate the orientation of the reflecting surface corresponding to the position of the pixel px calculated in step S204. After the controller 20 calculates the orientation of the reflecting surface, the process proceeds to step S207.

In steps S207 to S210, the controller 20 executes the same operations as in steps S105 to S108 of the processing executed by the controller 20 in the first embodiment to update the first related information.

Although the present disclosure has been explained using the accompanying drawings and examples, it is to be noted that various changes and modifications will be apparent to those of ordinary skill in the art based on the present disclosure. Therefore, such changes and modifications are to be understood as included within the scope of the present disclosure.

For example, in the first and second embodiments, the advancing unit 14 can switch the travel direction of the electromagnetic waves incident on the action surface as between two directions, i.e. the first direction d1 and the second direction d2, but the advancing unit 14 may instead be capable of switching the travel direction among three or more directions.

In the first and second embodiments, the first state of the advancing unit 14 is a first reflecting state for reflecting the electromagnetic waves incident on the action surface as in the first direction d1, and the second state of the advancing unit 14 is a second reflecting state for reflecting these electromagnetic waves in the second direction d2. This configuration is not, however, limiting.

For example, the second state may be a transmitting state for transmitting the electromagnetic waves incident on the action surface as for the electromagnetic waves to travel (propagate, advance) in the second direction d2. In greater detail, the advancing unit 14 may include a shutter, on each pixel px, that has a reflecting surface that reflects electromagnetic waves. The advancing unit 14 with this configuration can open and close the shutter of each pixel px to switch each pixel px between the first reflecting state and the transmitting state that is the second state. An example of the advancing unit 14 with such a configuration is an advancing unit that includes a MEMS shutter including a plurality of openable shutters arranged in an array. Another example of the advancing unit 14 is an advancing unit that includes a liquid crystal shutter capable of switching, in accordance with liquid crystal orientation, between the reflecting state for reflecting electromagnetic waves and the transmitting state for transmitting electromagnetic waves. The advancing unit 14 with this configuration can switch each pixel px between the reflecting state as the first state and the transmitting state as the second state by switching the liquid crystal orientation of each pixel px.

In the electromagnetic wave detection apparatus 10 of the first and second embodiments, the first detector 17 is a passive sensor, and the second detector 18 functions as a portion of an active sensor. The electromagnetic wave detection apparatus 10 is not, however, limited to this configuration. For example, the electromagnetic wave detection apparatus 10 can achieve similar effects as in the first and second embodiments when the first detector 17 and the second detector 18 are both passive sensors and when both function as a portion of an active sensor.

In the first and second embodiments, the electromagnetic wave detection apparatus 10 is configured to include the irradiator 11, the travel direction modifier 12, the memory 19, the controller 20, and the electromagnetic wave detector 21, but the electromagnetic wave detection apparatus 10 may be configured to include at least one of these components. An electromagnetic wave detection system may be configured so that the electromagnetic wave detection apparatus 10 includes at least the electromagnetic wave detector 21, with another apparatus including the other components.

In the first and second embodiments, the electromagnetic wave detection apparatus 10 is configured so that the travel direction modifier 12 scans the beam of electromagnetic waves emitted by the irradiator 11, thereby causing the second detector 18 to cooperate with the travel direction modifier 12 and function as a scanning-type active sensor. The electromagnetic wave detection apparatus 10 is not, however, limited to this configuration. For example, the electromagnetic wave detection apparatus 10 can achieve similar effects as in the first and second embodiments, without including the travel direction modifier 12, by causing electromagnetic waves to be emitted radially from the irradiator 11 and by acquiring information without scanning.

In the first embodiment, the electromagnetic wave detection apparatus 10 includes the advancing unit 14 and uses the first detector 17 to detect electromagnetic waves reflected by the advancing unit 14. The electromagnetic wave detection apparatus 10 is not, however, limited to this configuration. For example, the electromagnetic wave detection apparatus 10 can achieve similar effects as in the first embodiment, without including the advancing unit 14, by using the first detector 17 to detect incident electromagnetic waves that do not pass through the advancing unit 14.

In the first embodiment, the electromagnetic wave detection apparatus 10 includes the travel direction modifier 12 and uses the travel direction modifier 12 to scan the electromagnetic waves irradiated by the irradiator 11. The electromagnetic wave detection apparatus 10 is not, however, limited to this configuration. For example, the electromagnetic wave detection apparatus 10 can achieve similar effects as in the first embodiment, without including the travel direction modifier 12, when the irradiator 11 scans electromagnetic waves by causing light emission sources arrayed in a plane (for example, phased array radar) to emit light while the phase is shifted little by little, thereby changing the travel direction of the electromagnetic waves. In this case, the irradiator 11 is provided with the function of the travel direction modifier 12. The first related information in this case may associate the drive signal with the emission direction of electromagnetic waves, for which the travel direction was changed, instead of with the orientation of the reflecting surface.

In the first embodiment, the electromagnetic wave detection apparatus 10 includes the travel direction modifier 12 and uses the travel direction modifier 12 to scan the electromagnetic waves irradiated by the irradiator 11. The electromagnetic wave detection apparatus 10 is not, however, limited to this configuration. For example, the electromagnetic wave detection apparatus 10 can achieve similar effects as in the first embodiment, without including the travel direction modifier 12 or performing a scan, by adopting a flash method. The electromagnetic wave detection apparatus 10 always emits electromagnetic waves in the same emission direction in this case, since the emission direction of the electromagnetic waves is not changed by scanning. In this configuration, the memory 19 may therefore store the emission direction of the electromagnetic waves as the first related information, instead of storing the relationship between the signal value of the drive signal and the orientation of the reflecting surface.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

A machine-readable, non-transitory storage medium may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic and optical storage media (such as a compact disc (CD), laser disc® (laser disc is a registered trademark in Japan, other countries, or both), digital versatile disc (DVD), floppy disk, and Blu-ray Disc), portable computer disk, random access memory (RAM), read-only memory (ROM), rewritable programmable ROM such as EPROM, EEPROM, or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

10 Electromagnetic wave detection apparatus
11 Irradiator
12 Travel direction modifier
13 Pre-stage optical system
14 Advancing unit
15 First post-stage optical system
16 Second post-stage optical system
17 First detector
18 Second detector
19 Memory
20 Controller
21 Electromagnetic wave detector
as Action surface
d1 First direction
d2 Second direction
ob Object
px, px1, px2 Pixel

The invention claimed is:

1. An electromagnetic wave detection apparatus comprising:
   an irradiator configured to emit electromagnetic waves;
   a first detector comprising a plurality of detection elements configured to detect each of irradiation position, reflected waves of the electromagnetic waves irradiated on an object;
   an advancing unit comprising a plurality of advancing elements configured to cause the reflected waves of the electromagnetic waves irradiated on the object to travel towards different detection elements each of irradiation position;
   a second detector disposed in a second direction different than a first direction in which the first detector is disposed relative to the advancing unit, the second detector being configured to detect incident reflected waves of the electromagnetic waves;

a memory configured to store first related information including an emission direction of the electromagnetic waves; and a controller configured to update the first related information based on a position of a detection element, among the plurality of detection elements, that detects the reflected waves of the electromagnetic waves, wherein the advancing unit is configured to switch each advancing element between a first state of causing the reflected waves of the electromagnetic waves to travel in the first direction and a second state of causing the reflected waves of the electromagnetic waves to travel in the second direction.

2. The electromagnetic wave detection apparatus of claim 1, further comprising:

a travel direction modifier configured to change the emission direction, based on a drive signal outputted by the controller, of the electromagnetic waves emitted by the irradiator so as to change the irradiation position of the electromagnetic waves irradiated on the object;

wherein the memory is configured to store the first related information associating the drive signal and the emission direction of the electromagnetic waves; and wherein the controller is configured to update the first related information based on the position of the detection element, among the plurality of detection elements, that detects the reflected waves of the electromagnetic waves when the drive signal is outputted to the travel direction modifier.

3. The electromagnetic wave detection apparatus of claim 2, wherein the memory is configured to store second related information associating the emission direction and the position of the detection element; and wherein the controller is configured to update the first related information based on the emission direction calculated from the position of the detection element that detects the reflected waves of the electromagnetic waves and the second related information, and the drive signal outputted.

4. The electromagnetic wave detection apparatus of claim 2, further comprising:

wherein the memory is configured to store a third related information associating a position of the advancing element and a position of a detection element to which the advancing element causes the reflected waves of the electromagnetic waves to travel, and to store a fourth related information associating the emission direction and the position of the advancing element; and wherein the controller is configured to update the first related information based on the emission direction calculated from the position of the advancing element and the fourth related information, the position of the advancing element being calculated from the position of the detection element that detects the reflected waves of the electromagnetic waves and the third related information, and the drive signal outputted.

5. The electromagnetic wave detection apparatus of claim 2, wherein the controller is configured to update the first related information by updating a relationship between the drive signal and the emission direction in the first related information.

6. The electromagnetic wave detection apparatus of claim 2, wherein the controller is configured to update the first related information by updating a function indicating a correlation between the drive signal and the emission direction in the first related information.

7. The electromagnetic wave detection apparatus of claim 2, wherein the first related information is a plurality of signal values of the drive signal and the emission direction associated with each of the signal values; and wherein the controller is configured to update the first related information by updating an association between the plurality of signal values of the drive signal and the emission direction in the first related information.

8. The electromagnetic wave detection apparatus of claim 7, wherein the controller is configured to update the first related information by updating the plurality of signal values of the drive signal in the first related information.

9. The electromagnetic wave detection apparatus of claim 1, wherein the controller is configured to update the first related information by updating the emission direction in the first related information.

10. The electromagnetic wave detection apparatus of claim 1, comprising a reflecting surface configured to reflect the electromagnetic waves emitted from the irradiator while changing an orientation in accordance with a drive signal outputted by the controller, so as to irradiate the object while changing the irradiation position.

11. The electromagnetic wave detection apparatus of claim 1, further comprising:

a travel direction modifier configured to change the emission direction, based on a drive signal outputted by the controller, of the electromagnetic waves emitted by the irradiator so as to change the irradiation position of the electromagnetic waves irradiated on the object, wherein the controller is configured to update the first related information based on the outputted drive signal and the position of the detection elements, in the first detector, that detects the reflected waves of the electromagnetic waves.

12. The electromagnetic wave detection apparatus of claim 11, wherein the advancing unit is configured to switch at least a part of the advancing elements on which the reflected waves is not incident to the first state and to switch at least a part of the advancing elements on which the reflected waves is incident to the second state.

13. A non-transitory computer-readable recording medium that stores a control program for causing an apparatus to execute processes comprising:

emitting electromagnetic waves;

using a first detector comprising a plurality of detection elements to detect each of irradiation position, reflected waves of the electromagnetic waves irradiated on an object;

using an advancing unit comprising a plurality of advancing elements to cause the reflected waves of the electromagnetic waves irradiated on the object to travel towards different detection elements each of irradiation position;

using a second detector, disposed in a second direction different than a first direction in which the first detector is disposed relative to the advancing unit, to detect incident reflected waves of the electromagnetic waves;

updating first related information based on a position of a detection element, among the plurality of detection elements, that detects the reflected waves of the electromagnetic waves, the first related information including an emission direction of the electromagnetic waves; and switching each advancing element between a first state of causing the reflected waves of the electromagnetic waves to travel in the first direction and a second state of causing the reflected waves of the electromagnetic waves to travel in the second direction.

14. An electromagnetic wave detection system comprising:
- an irradiator configured to emit electromagnetic waves;
- a first detector comprising a plurality of detection elements configured to detect each of irradiation position, reflected waves of the electromagnetic waves irradiated on an object;
- an advancing unit comprising a plurality of advancing elements configured to cause the reflected waves of the electromagnetic waves irradiated on the object to travel towards different detection elements each of irradiation position;
- a second detector disposed in a second direction different than a first direction in which the first detector is disposed relative to the advancing unit, the second detector being configured to detect incident reflected waves of the electromagnetic waves;
- a memory configured to store first related information including an emission direction of the electromagnetic waves; and
- a controller configured to update the first related information based on a position of a detection element, among the plurality of detection elements, that detects the reflected waves of the electromagnetic waves, wherein the advancing unit is configured to switch each advancing element between a first state of causing the reflected waves of the electromagnetic waves to travel in the first direction and a second state of causing the reflected waves of the electromagnetic waves to travel in the second direction.

* * * * *